United States Patent
Loy et al.

(10) Patent No.: US 10,552,982 B2
(45) Date of Patent: Feb. 4, 2020

(54) METHOD FOR AUTOMATICALLY ESTABLISHING EXTRINSIC PARAMETERS OF A CAMERA OF A VEHICLE

(71) Applicant: Continental Teves AG & Co. oHG, Frankfurt (DE)

(72) Inventors: Claudia Loy, München (DE); Claudio Heller, München (DE); Alexey Abramov, München (DE); Christopher Bayer, München (DE)

(73) Assignee: Continental Teves AG & Co. OHG, Hannover (DE)

( * ) Notice: Subject to any disclaimer, the term of this patent is extended or adjusted under 35 U.S.C. 154(b) by 0 days.

(21) Appl. No.: 15/813,630

(22) Filed: Nov. 15, 2017

(65) Prior Publication Data

US 2018/0150976 A1    May 31, 2018

(30) Foreign Application Priority Data

Nov. 25, 2016    (DE) .......................... 10 2016 223 422

(51) Int. Cl.
*G06T 7/80*    (2017.01)
*G06K 9/00*    (2006.01)

(52) U.S. Cl.
CPC ............ *G06T 7/80* (2017.01); *G06K 9/00791* (2013.01); *B60R 2300/30* (2013.01); *G06T 2207/30252* (2013.01)

(58) Field of Classification Search
CPC ............ G06T 7/80; G06T 2207/30256; G06T 2207/20081; G06T 2207/30261; G06T 2207/10016; G06T 2207/20084; G06T 2207/30252; G06K 9/627; G06K 9/00791;
(Continued)

(56) References Cited

U.S. PATENT DOCUMENTS

| | | | | |
|---|---|---|---|---|
| 2010/0201814 A1* | 8/2010 | Zhang | .................. | G06K 9/4647 348/148 |
| 2012/0287232 A1* | 11/2012 | Natroshvili | ............... | G06T 7/33 348/36 |

(Continued)

FOREIGN PATENT DOCUMENTS

FR    3043824 A3 *   5/2017    ............... G06T 7/80

OTHER PUBLICATIONS

Gurghian et al., Deep Lanes: End-To-End Lane Position Esitmation Using Deep Neural Networks, CVPR workshop paper, Proceedings of the IEEE Conference on Computer Vision and Pattern Recognition Workshops, Dec. 19, 2016, pp. 38-45.

(Continued)

*Primary Examiner* — Marnie A Matt

(57) ABSTRACT

A method for automatically establishing extrinsic parameters of a camera of a vehicle includes repeatedly establishing the extrinsic parameters of the camera during a measurement run, wherein sensor data are generated by a sensor each time the extrinsic parameters of the camera are established. The established parameters and the associated sensor data respectively are stored in a database. A convolutional neural network is trained based on the extrinsic parameters stored in the database and based on the sensor data. The extrinsic parameters of the camera are subsequently determined online by utilizing the trained convolutional neural network.

8 Claims, 2 Drawing Sheets

(58) Field of Classification Search
CPC ... G06N 3/0454; G06N 3/082; B60R 2300/30
USPC ......................................................... 348/148
See application file for complete search history.

(56) References Cited

U.S. PATENT DOCUMENTS

| | | | |
|---|---|---|---|
| 2015/0317781 A1* | 11/2015 | Napier .................. | G01S 17/023 |
| | | | 348/46 |
| 2016/0140438 A1* | 5/2016 | Yang ........................ | G06N 3/08 |
| | | | 706/12 |
| 2017/0132758 A1* | 5/2017 | Paluri ................. | G06K 9/00744 |
| 2017/0185870 A1* | 6/2017 | Romanenko .............. | G06T 7/70 |

OTHER PUBLICATIONS

Hold et al., A Novel Approach for the Online Initial Calibration of Extrinsic Parameters for a Car-Mounted Camera, Proceedings of 12th International IEEE Conference on Intelligent Transportation, Oct. 4-7, 2009, St Louis, MO, USA, pp. 420-425.
Schneider et al. RegNet: Multimodal Sensor Registration Using Deep Neural Networks, IEEE Intelligent Vehicles Symposium (IV), Redondo Beach, CA, USA Jun. 11-17, 2017.
Itu et al., Automatic Extrinsic Camera Parameters Calibration Using Convoluntional Neural Networks, Intelligent Computer Communication and Processing (ICCP), 2017.
Kendall et al., PoseNet: A Convolutional Network for Real-Time 6-DOF Camera Relocalizaiton, Proceedings of the IEEE International Conference on Computer Vision, 2015, pp. 2938-2946.
German Search Report dated Dec. 15, 2017 for corresponding German Patent Application No. 10 2016 223 422.6.

* cited by examiner

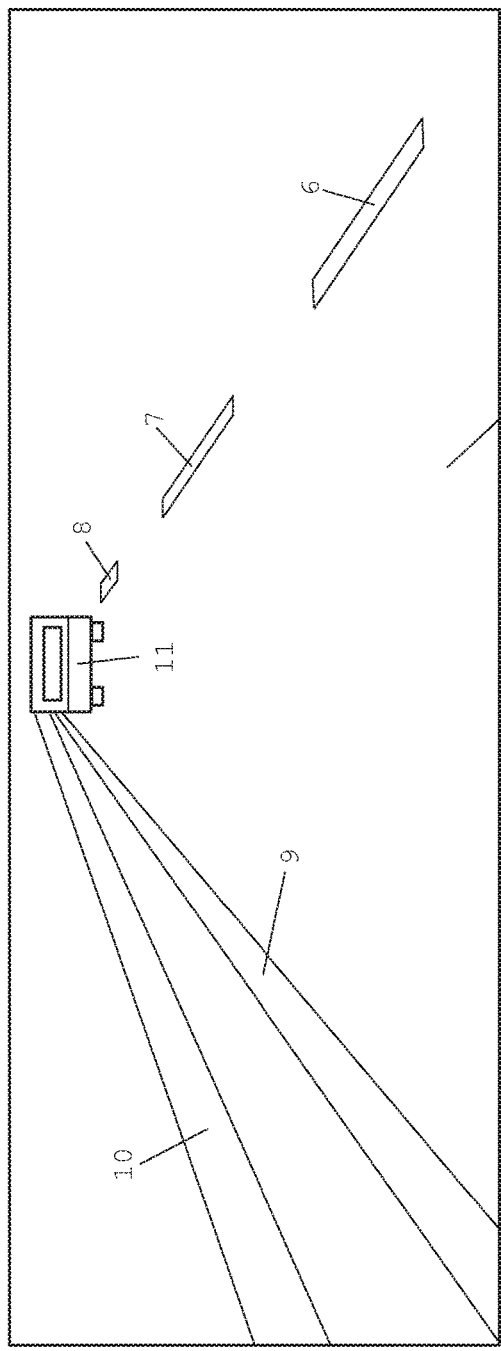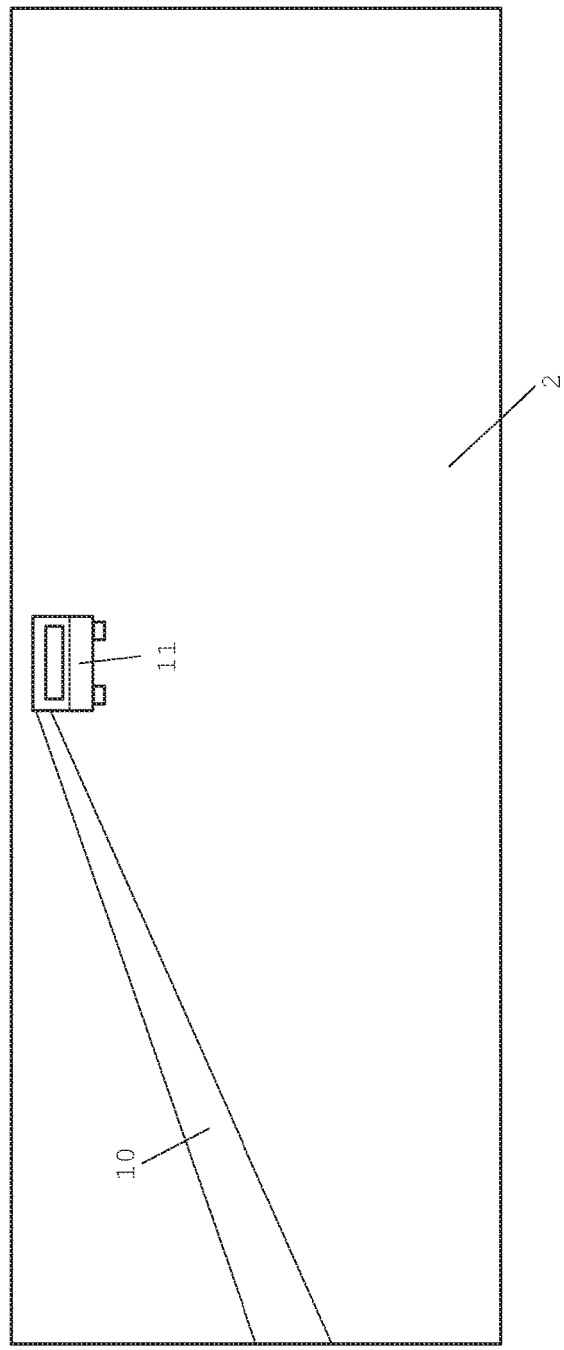

METHOD FOR AUTOMATICALLY ESTABLISHING EXTRINSIC PARAMETERS OF A CAMERA OF A VEHICLE

CROSS REFERENCE TO RELATED APPLICATION

This application claims the benefit of German application No. 10 2016 223 422.6, filed Nov. 25, 2016, which is hereby incorporated by reference.

TECHNICAL FIELD

The technical field relates to a method for automatically establishing or respectively estimating extrinsic parameters of a camera of a vehicle.

BACKGROUND

Extrinsic parameters of a camera include, in particular, a position and an alignment or respectively an angle of the camera relative to a vehicle, on which the camera is mounted, wherein the angles or respectively positions also have to be additionally determined relative to the roadway for lane algorithms. The establishment of the extrinsic parameters therefore involves, in particular, an estimation of an orientation of the camera affixed to the vehicle relative to a coordinate system of the vehicle. The establishment of the camera orientation with regard to the vehicle typically provides a snapshot, typically within the context of a so-called "end-of-line" calibration at the end of a production cycle of the vehicle, wherein e.g. calibration patterns or laser techniques are used.

Such calibration procedures, which are typically carried out in a production facility in which the vehicle is manufactured or at least assembled and tested prior to being delivered to a customer, frequently cause relatively high costs. Furthermore, an estimation of the relative installation position and of the relative angle of the camera with respect to the vehicle can contain inaccuracies. Moreover, the calibration merely provides a snapshot. However, the extrinsic camera parameters change over the time that the vehicle is used. The reason for this is, in particular, external influences. Thus, e.g. braking operations and acceleration operations lead to a change in the pitch angle relative to the road and a(n) (uneven) loading of the vehicle can result in a change in the height of the camera and can change the angle of roll of the vehicle. In addition, temperature influences and loads over time can lead to a decalibration of the camera.

Furthermore, so-called "online" calibration methods are known, which are based on an extraction of objects/features (for example, lane markers or ground textures), as a result of which the possible area of application is, however, restricted. Geometric assumptions can also be made (for example, the so-called "flat world" assumption or a horizon estimation), or sensor data can be used (for example, by radar object recognition), in order to determine or respectively estimate the extrinsic parameters of the camera.

In their article "Selfcalibration system for the orientation of a vehicle camera" (published in Proc. of the ISPRS Com. V Symposium: Image Engineering and Vision Metrology, 2006, pages 68-73), Á. Catalá-Prat, J. Rataj and R. Reulke describe a calibration method which is based on a detection of road markings. Similar concepts are described by S. Hold, S. Gormer, A. Kummert, M. Meuter and S. Muller-Schneiders in their article "A novel approach for the online initial calibration of extrinsic parameters for a carmounted camera" (published in ITSC'09. 12$^{th}$ International IEEE Conference on Intelligent Transportation Systems, 2009, IEEE, 2009, pages 1-6), or by M. Wu and X. An in their article "An automatic extrinsic parameter calibration method for camera-on-vehicle on structured road" (published in IC-VES. IEEE International Conference on Vehicular Electronics and Safety, 2007, IEEE, 2007, pages 1-5).

In addition, in their article "Homography-based extrinsic selfcalibration for cameras in automotive applications" (published in Workshop on Intelligent Transportation, 2010, pages 17-22), M. Miksch, B. Yang, and K Zimmermann present a system which uses a natural texture of a roadway for the calibration, wherein a flat roadway is assumed, the location of which in the image has to be known, as a result of which the system is dependent on the vehicle odometry.

Camera data of the vehicle are typically used following a coordinate transformation into the vehicle coordinates and following a subsequent transformation into the roadway coordinates. In this case, the positional accuracy of the camera data processing is directly proportional to the accuracy of the camera parameter estimation. A level of accuracy requiring a high quality in the estimation or respectively establishment of the extrinsic parameters of the camera of the vehicle is thus needed for a transformation into another coordinate system, e.g. for a fusion with other sensor data in the driver assistance field.

As such, it is desirable to present an alternative method for automatically establishing or respectively estimating extrinsic parameters of a camera of a vehicle, wherein the method solves the problems of the prior art, which are described above. In addition, other desirable features and characteristics will become apparent from the subsequent summary and detailed description, and the appended claims, taken in conjunction with the accompanying drawings and this background.

SUMMARY

According to a first aspect, a method for automatically establishing extrinsic parameters of a camera of a vehicle is provided. The method includes providing a vehicle with a camera. The vehicle is, for example, a motor vehicle such as a car, a bus or a truck, or even a rail vehicle, a ship, an aircraft, such as a helicopter or an airplane or, for example, a bicycle. The camera is preferably a digital camera which is mounted on the vehicle in such a manner that the camera can capture an area surrounding the vehicle, wherein the digital camera can record images or film footage of the area surrounding the vehicle, and can save, process, output and transfer or respectively transmit image data representing the image acquisitions or film footage.

In accordance with the method, the extrinsic parameters of the camera are repeatedly established during at least one measurement run, wherein sensor data is generated by a sensor each time the extrinsic parameters of the camera are established. The established parameters or respectively parameter data, which represent the established parameters, and the associated sensor data respectively are stored or respectively deposited in a database.

In this case, one aim is to deposit "perfect data", so to speak, in the database, i.e. data which, in particular, represent directly captured, high-precision specific relative angles of the camera and other extrinsic parameters of the camera (ground truth). A "measurement run" in this context can, in particular, denote a run performed with the vehicle, which takes place prior to the vehicle being delivered, in particular prior to the vehicle being delivered for the first time, to a customer. Measurement runs can be performed with various vehicles or respectively various cameras. The results can then be transferred. It is not necessary to perform measurement runs with each vehicle or respectively with each camera, in which the method is to be executed. In other words, the extrinsic parameters of the camera, in particular a position of the camera relative to the vehicle and an alignment or respectively an angle of the camera relative to the vehicle are established extremely accurately so to speak "by the factory", and are deposited together with the associated sensor data in the database. Furthermore, a position or respectively an alignment with regard to the vehicle with respect to a road on which the vehicle is moving must be deposited in association therewith.

The extrinsic parameters regarding the roadway coordinates during the measurement run can, in this case, be established by at least one external reference sensor, e.g. by reference sensor technology, which comprises a measurement platform known by the name of "RT4000", which combines inertial navigation systems with modern, GPS-based systems. Therefore, reference sensor technology which may possibly be relatively expensive only has to be used once during the measurement run. For example, the extrinsic parameters can be created with test vehicles within the framework of the development of the algorithms, wherein it is not necessary for the extrinsic parameters to be established with the assistance of the reference sensor technology in all of the vehicles in which the method is to be executed. Furthermore, the reference sensor technology does not have to be provided permanently since a subsequent classification or respectively an online establishing of the extrinsic parameters of the camera—as described below—takes place with the aid of a trained convolutional neural network ("CNN"). Alternatively or in addition to the at least one reference sensor, it can also be envisaged that the extrinsic parameters of the camera are established during the measurement run by an algorithm for calibration, wherein the calibration algorithm can, in particular, use an object/feature extraction.

The method further includes a training of a convolutional neural network ("CNN") based on the extrinsic parameters stored in the database, on the one hand (or respectively based on parameter data which represent the extrinsic parameters of the camera established during the measurement run), and based on the sensor data generated by the sensor of the vehicle, on the other hand.

According to one embodiment, the camera can form the sensor, wherein an image is generated by the camera and a corresponding image dataset is generated each time the extrinsic parameters of the camera are established. The established parameters or respectively the corresponding parameter data and the associated image dataset respectively are stored according to this embodiment in the database, and the training of the convolutional neural network is carried out based on the parameter data stored in the database and the image datasets.

Alternatively or additionally, a laser unit or a radar unit can also, for example, form the sensor, wherein sensor data are generated by the laser unit or the radar unit each time the extrinsic parameters of the camera are established. The established parameters or respectively the corresponding parameter data and the associated sensor data respectively of the laser unit or the radar unit are stored in accordance with this embodiment in the database, and the training of the convolutional neural network is carried out based on the parameter data stored in the database and the sensor data of the laser unit or the radar unit. The use of a camera and the images thereof can be dispensed with according to this embodiment.

During the training of the convolutional neural network, the image recorded by the camera can, in particular, be used as an input variable, wherein the extrinsic parameters of the camera established during the measurement run are used as a nominal variable. The convolutional neural network can therefore learn the relationship between the image information and the extrinsic parameters which are also deposited in the database. Labeling effort—as in the case of other applications of deep learning/supervised learning—is not required to train data. According to one embodiment, it is envisaged that an L2-norm is used as a quality functional to train the convolutional neural network.

In addition, the method envisages that the extrinsic parameters of the camera are determined online by utilizing the trained convolutional neural network. For example, an algorithm which includes the trained convolutional neural network can be deposited in a memory unit of the camera. The extrinsic parameters of the camera can, in particular, be determined online in that the camera records a new image or multiple new images consecutively, after the measurement run has been carried out and after the convolutional neural network has been trained and has been made available to the camera (e.g. in the memory unit of the camera indicated above). More precisely, the algorithm for calibrating the camera can be made available to cameras or respectively central processing units, after the convolutional neural network has been trained on the basis of the database. No further measurement run is then required.

An image dataset can be generated for each new image, the image dataset representing the respective new image recorded. The at least one image dataset can be evaluated to the effect that the extrinsic parameters of the camera are determined, by utilizing the algorithm which includes the trained convolutional neural network.

Therefore, the extrinsic parameters of the camera can be determined online during the operation of the vehicle—continually and automatically including long after the extrinsic parameters of the camera have been determined during the measurement run—during each run (without measurements being required). Reference sensor technology is no longer required for this. In addition to the establishment or respectively estimation of the extrinsic parameters of the camera, a height profile of a road on which the vehicle is driving and which is captured by the camera can also be learned as well by the convolutional neural network, in order to break the widespread "flat world assumption" in particular.

According to another embodiment, it is envisaged that the images recorded by the camera are manipulated (so-called "data augmentation") or regulating methods are used, e.g. a so-called "dropout", to train the convolutional neural network. The regulating methods can be used to reduce the size of the database and, therefore, the number of measurement runs. For example, image segments of lane markers can be removed when using calibration methods based on lane markers as a reference during, respectively, the learning or training. As a result, the convolutional neural network can be trained based on other image segments which show e.g. guardrails. The convolutional neural network which has been trained in this way makes it possible for the online determination of the extrinsic parameters of the camera to also be applied in scenarios in which no markings are present, for example, although the training data originate from a method based on markings. In this case, feature-based calibration algorithms can be used and generalized in that the convolutional neural network is trained based on different features and can therefore determine the extrinsic parameters of the camera online in situations in which the image of the camera includes at least one of the features which has been used to train the convolutional neural network.

Furthermore, the training of the convolutional neural network can additionally be based on disparity maps, optical flow or radar data (in particular objects or clusters) or similar, in order to make possible and/or improve the accuracy of the establishment or respectively estimation of the extrinsic parameters of the camera.

According to another embodiment, it is envisaged that the database is continually extended with a backend, e.g. with an external computer or a server. The offline newly trained convolutional neural network can then, in turn, be updated by a backend connection on the vehicle. This makes it possible to continuously improve and extend the functionality.

According to a second aspect, a programming element is provided. The programming element, when it is run on a processor, instructs the processor to perform the method steps of the method according to the first aspect, and indeed at least the method steps which relate to the training of the convolutional neural network and the online determining of the extrinsic parameters of the camera.

According to a third aspect, a computer-readable medium is provided. A programming element is stored on the computer-readable medium, which, when it is run on a processor, instructs the processor to perform the method steps of the method according to the first aspect, and indeed at least the method steps which relate to the training of the convolutional neural network and the online determining of the extrinsic parameters of the camera.

BRIEF DESCRIPTION OF THE DRAWINGS

Embodiment examples will be explained in greater detail below with reference to the schematic drawing, wherein:

FIG. 2 shows an image recorded by the camera according to FIG. 1,
and
FIG. 3 shows the image from FIG. 2 following a "dropout" processing.

DETAILED DESCRIPTION

Figure 1:
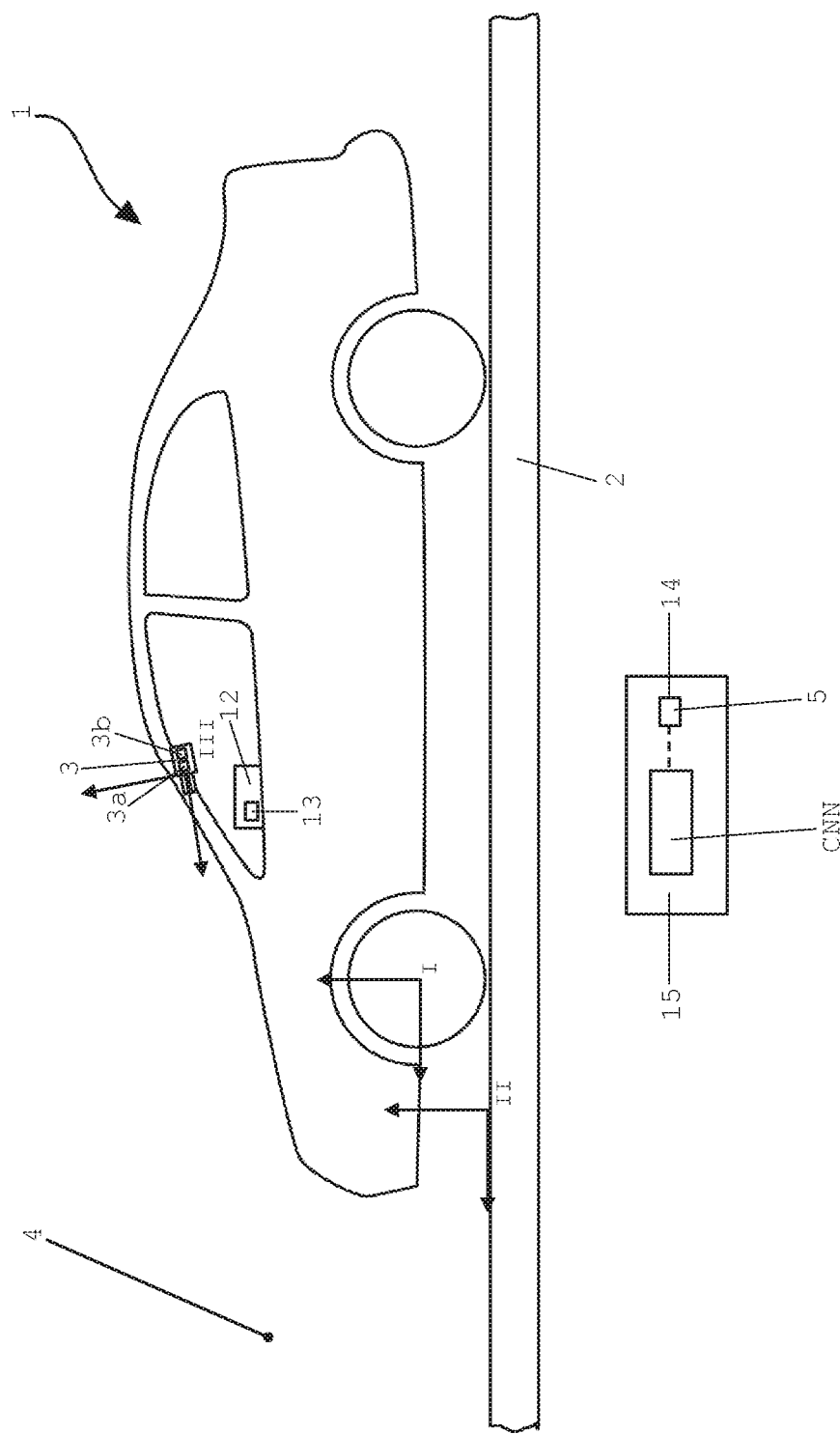
FIG. 1 shows a side view of a vehicle having a camera.

FIG. 1 shows a vehicle 1 in the form of a car having a vehicle coordinate system I, wherein the vehicle 1 is moving along a roadway or a road 2 having a road coordinate system II. The vehicle 1 is provided with a camera 3 having a camera coordinate system III, wherein the camera is in particular mounted on the vehicle 1 at a specific position inside the vehicle 1 in a specific alignment or respectively at a specific angle relative to the vehicle 1. This relative position and this specific angle or respectively this specific alignment can together form the extrinsic parameters of the camera 3 following transformation into the road coordinate system II. In the embodiment example shown by FIG. 1, the camera 3 is mounted on the vehicle 1 in such a manner that the camera 3 can capture a region in front 4 of the vehicle 1 and can record images which include the region in front 4 of the vehicle 1 (cf. FIGS. 2 and 3).

The camera 3 includes a control unit 3a and a memory unit 3b. The extrinsic parameters of the camera 3 are determined repeatedly by reference sensor technology 12 during a measurement run with the vehicle 1 and a corresponding parameter dataset is generated during each measurement. The parameter datasets can, in this case, be stored for example in a memory unit 13 of the reference sensor technology 12. Alternatively, the parameter datasets can be transferred, for example, to a memory unit 14 of an external computer 15.

During each of the measurements of the extrinsic parameters of the camera 3, the camera 3 continues to record an image, and creates an image dataset representing the image. Therefore, a parameter dataset and an image dataset respectively form a pair of values, wherein the parameter dataset can comprise multiple sub-datasets which represent, for example, an installation position of the camera 3 inside the vehicle 1 and an alignment of the camera 3 relative to the vehicle 1 or respectively an angle of the camera 3 relative to the vehicle 1, as well as an alignment or respectively an angle relative to the road 2. The pairs of values are stored or respectively saved in a database 5, wherein the database 5 is arranged, for example, in the memory unit 14 of the external computer 15, or in an external memory unit (not shown) which is connected to the external computer 15.

Alternatively, instead of the reference sensor technology 12 or in addition to the reference sensor technology 12, an algorithm for calibration can also be used to determine the extrinsic parameters of the camera 3, wherein said algorithm can be based on an object/feature extraction. The images which are recorded by the camera 3 or respectively the corresponding image data are available to this algorithm, in order to establish the extrinsic parameters of the camera 3 therefrom, which extrinsic parameters are then available as "perfect" parameter data (ground truth), so to speak, and—combined with the associated image dataset respectively—are stored in the database 5.

A convolutional neural network CNN can access the pairs of values stored in the database 5 and can be trained, for example, on the external computer 15 based on the pairs of values deposited in the database 5. During the training of the convolutional neural network CNN, an L2-norm can be used as a quality functional. Furthermore, the training of the convolutional neural network CNN can additionally be based on disparity maps, optical flow or radar data.

The camera 3 can have recourse to an algorithm including the trained convolutional neural network CNN, in order to determine current extrinsic parameters of the camera 3 online with reference to images which are newly recorded by the camera 3 (i.e. temporally following the measurement run and following the training of the convolutional neural network CNN), for which corresponding new image datasets can be stored in the memory unit 3b of the camera 3. The algorithm including the convolutional neural network CNN can, to this end, be transferred, for example, by the external computer to the memory unit 3b of the camera 3. The control unit 3a of the camera 3 can establish the extrinsic parameters of the camera 3 online, using the new image datasets stored in the memory unit 3b of the camera 3 by utilizing the algorithm. Furthermore, the database 5 can be continually extended with a backend, e.g. formed by an external computer or server. The offline newly trained convolutional neural network can then be updated by a backend connection on the vehicle 1.

FIG. 2 shows an image which has been recorded by the camera 3 of the vehicle 1 in accordance with FIG. 1, and is used to train the convolutional neural network CNN. The image includes the region in front 4 of the vehicle 1 shown in FIG. 1. The image according to FIG. 2 is used as an input variable for training the convolutional neural network CNN, wherein the associated extrinsic parameters of the camera 3 stored in the database 5 are used as a nominal variable and the L2-norm is used as a quality function.

The image includes a road 2 along which the vehicle 1 is moving, a first middle road marking 6, a second middle road marking 7, a third middle road marking 8, a continuous outer road marking 9 shown on the left in FIG. 2, a guardrail 10 shown on the left in FIG. 2 above the outer road marking 9 as well as a truck 11 between the third middle road marking 8 and the outer road marking 9.

For example, an algorithm can be applied which extracts the middle road markings 6 to 8 and the outer road marking 9 as features for determining the extrinsic parameters of the camera 3. The feature information required for this is contained in the image according to FIG. 2 and can therefore be considered during the learning process or respectively training of the convolutional neural network CNN, e.g. the road markings 6 to 9 and the alignment thereof.

For the training of the convolutional neural network CNN, the image—as shown by FIG. 3—can be manipulated and made "worse", so to speak, in terms of its information content, in order to increase the robustness and generalization of the convolutional neural network CNN. The aim in this case is to train the convolutional neural network CNN to the effect that it can deal with the poorer image material, i.e. it selects features from the image material, with which it can alternatively calculate the extrinsic parameters of the camera.

For example, regions which show the middle road markings 6 to 8 and the outer road marking 9 ("dropout"), i.e. the regions which the algorithm has extracted for determining the current extrinsic parameters of the camera 3, can be concealed in the image. As a result, the road markings 6 to 9 are no longer available to the convolutional neural network CNN for the training thereof, but only the remaining information of the image which is not concealed. During the dropout care is to be taken to ensure that no manipulations of the image take place which have repercussions on the angle of the features.

The remaining information, e.g. the guardrail 10 and the truck 11, and the extrinsic parameters of the camera 3 established during the measurement run are, in this case, made available to the convolutional neural network CNN. As a result, the convolutional neural network CNN automatically learns to use other criteria as well, apart from, for example, road markings, which other criteria can help it to determine the extrinsic parameters of the camera 3 (generalization).

If, following the training of the convolutional neural network CNN, the vehicle 1 records another image utilizing the camera 3, in order to determine the extrinsic parameters of the camera 3 online, the situation can occur that the image does not, for example, show any road markings. In this case, the trained convolutional neural network CNN makes it possible, due to the generalization described above, to nevertheless determine the extrinsic parameters of the camera 3 online with reference to other features, e.g. with reference to guardrails 10, other markings, or other road users 11, and to therefore provide solutions which cannot be made possible with traditional approaches.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

The invention claimed is:

1. A method for automatically establishing extrinsic parameters of a camera of a vehicle, the method comprising:
    repeatedly establishing the extrinsic parameters of the camera during a measurement run utilizing a reference sensor external from the camera, wherein an image is generated by the camera and a corresponding image dataset is generated each time the extrinsic parameters of the camera are established;
    storing the established extrinsic parameters and the associated image dataset respectively in a database;
    training a convolutional neural network based on the extrinsic parameters stored in the database and based on the image dataset; and
    determining the extrinsic parameters of the camera online such that the camera records at least one new image, generates a corresponding new image dataset, and evaluates the new image dataset by utilizing the trained convolutional neural network without need of the reference sensor.

2. The method according to claim 1, wherein the extrinsic parameters are established during the measurement run utilizing an algorithm for calibration, wherein an object/feature extraction is used.

3. The method according to claim 1, wherein an L2-norm is used as a quality functional to train the convolutional neural network.

4. The method according to claim 1, wherein the images recorded by the camera are manipulated to train the convolutional neural network.

5. The method according to claim 1, wherein regulating methods are utilized to train the convolutional neural network.

6. The method according to claim 1, wherein the training of the convolutional neural network is additionally based on disparity maps, optical flow, or radar data.

7. The method according to claim 1, wherein the database is continually extended with a backend.

8. A non-transient computer-readable medium, on which a programming element is stored, which, when it is run on a processor, instructs the processor to perform a method for automatically establishing extrinsic parameters of a camera of a vehicle, the method comprising:
    repeatedly establishing the extrinsic parameters of the camera during a measurement run utilizing a reference sensor external from the camera, wherein an image is generated by the camera and a corresponding image dataset is generated each time the extrinsic parameters of the camera are established;
    storing the established extrinsic parameters and the associated image dataset respectively in a database;
    training a convolutional neural network based on the extrinsic parameters stored in the database and based on the image dataset; and
    determining the extrinsic parameters of the camera online such that the camera records at least one new image, generates a corresponding new image dataset, and evaluates the new image dataset by utilizing the trained convolutional neural network without need of the reference sensor.

* * * * *